(12) United States Patent  (10) Patent No.: US 8,757,012 B2
Strothmann  (45) Date of Patent: Jun. 24, 2014

(54) TORQUE SENSOR

(76) Inventor: Rolf Strothmann, Saarbruecken (DE)

(*) Notice: Subject to any disclaimer, the term of this patent is extended or adjusted under 35 U.S.C. 154(b) by 45 days.

(21) Appl. No.: 13/477,504

(22) Filed: May 22, 2012

(65) Prior Publication Data

US 2012/0297894 A1  Nov. 29, 2012

(30) Foreign Application Priority Data

May 24, 2011 (DE) .......... 10 2011 076 372
Jan. 27, 2012 (DE) .......... 10 2012 100 682

(51) Int. Cl.
*G01L 3/24* (2006.01)
*G01L 3/12* (2006.01)
*G01L 3/10* (2006.01)

(52) U.S. Cl.
CPC .. *G01L 3/109* (2013.01); *G01L 3/12* (2013.01)
USPC .......................................................... 73/862

(58) Field of Classification Search
USPC .............. 73/862, 862.193, 862.23, 862.08, 73/862.321, 862.195, 863.12; 324/207.25
See application file for complete search history.

(56) References Cited

U.S. PATENT DOCUMENTS

| | | | | |
|---|---|---|---|---|
| 4,581,923 A * | 4/1986 | Nitao et al. | ................ | 73/114.13 |
| 6,087,915 A * | 7/2000 | Leupold | ........................ | 335/284 |
| 6,382,034 B1 * | 5/2002 | Yasui et al. | ................ | 73/862.08 |
| 7,034,522 B2 * | 4/2006 | Gester | ...................... | 324/207.16 |
| 7,178,472 B2 * | 2/2007 | Pleyer | .......................... | 111/170 |
| 2003/0051562 A1 * | 3/2003 | Jin et al. | .................. | 73/862.331 |
| 2007/0152856 A1 * | 7/2007 | Yamamoto | .................... | 341/115 |
| 2007/0175272 A1 * | 8/2007 | Kondo | ......................... | 73/118.1 |

* cited by examiner

*Primary Examiner* — Julio J Maldonado
*Assistant Examiner* — Sheikh Maruf
(74) *Attorney, Agent, or Firm* — Jordan and Hamburg LLP

(57) ABSTRACT

A torque sensor comprises a freewheel with a first rotating element for transferring a torque to be determined to a second rotating element which is coaxial to the first rotating element, the transfer occurring in one rotational direction, and devices for determining a rotation of the first rotating element relative to the second rotating element in said rotational direction and for determining the torque using the determined relative rotation.

16 Claims, 2 Drawing Sheets

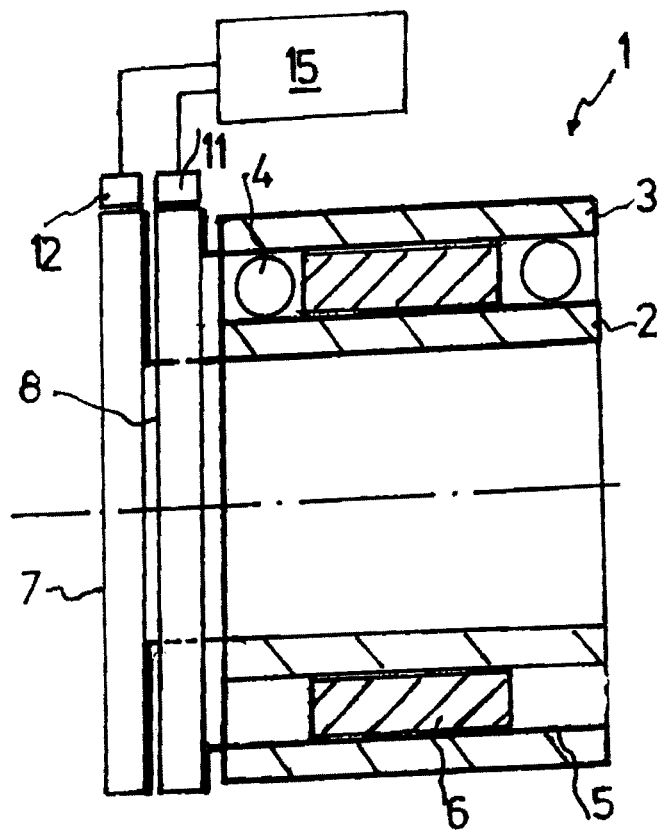
FIG. 1
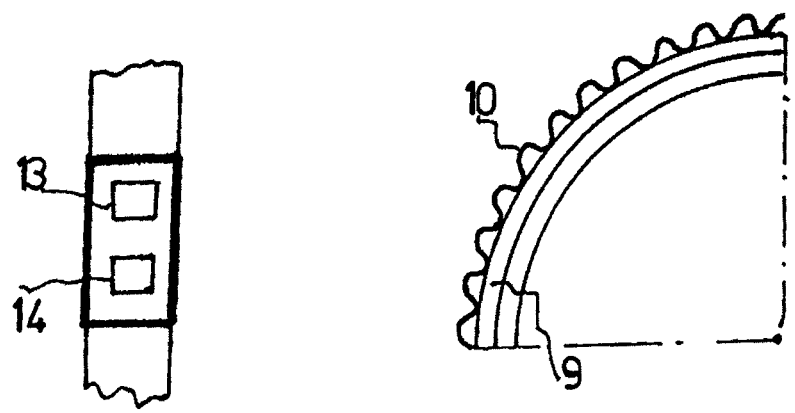
FIG. 2
FIG. 3

TORQUE SENSOR

BACKGROUND OF THE INVENTION

The invention relates to a torque sensor that can be used in drive instrumentation.

This torque sensor according to the invention comprises a freewheel with a first rotating element for transferring a torque to be determined to a second rotating element which is coaxial to the first rotating element, the transfer occurring in one rotational direction, and devices for determining a rotation of the first rotating element relative to the second rotating element in said rotational direction as well as devices for determining the torque using the determined relative rotation.

According to the invention, the torque that is causing this relative rotation can be determined using the extent of the rotation of the two rotating elements relative to one another in said direction. An advantage is that the freewheel can perform a dual function as the machine element which transfers the rotational motion and as the sensor component which produces the measurement effect. The freewheel only needs to be slightly modified in order to be used as the torque sensor.

Whereas it would be possible to directly detect the degree of rotation of the rotating elements relative to one another, in a preferred embodiment of the invention, the devices for determining the relative rotation are provided for the purposes of determining the rotational angles of the two rotating elements independent of one another.

It is useful that the devices for determining the relative rotation of the rotating elements can also find derivations of the detected rotational angles as a function of time and thereby determine the rotational velocity n of the first rotating element and the rotational velocity n' of the second rotating element.

The device for determining the relative rotation of the rotating elements continuously compares n and n', for example. When the rotational velocity n of the first rotating element reaches the rotational velocity n' of the second rotating element, this indicates the beginning of the transfer of a torque. The device for determining the relative rotation of the rotating elements determines the rotational angles that have been traversed since this time, and also determines the rotational velocities n, n'. Rotational velocity n temporarily exceeds rotational velocity n', whereupon it again approaches n' at constant torque. When n=n', the freewheel transfers the torque to be measured. The angle $\alpha$ of relative rotation is calculated from the difference in rotational angles of the rotating elements, these angles having been determined based on the time mentioned above. The torque sensor then calculates the torque to be determined using a stored relationship between the angle $\alpha$ and the torque.

The devices for determining the relative rotation of the rotating elements preferably comprise at least one measuring ring which is coaxial to one of the rotating elements, the measuring ring comprising a peripheral marking and a detector for scanning the marking.

The marking can be an optically scannable dashed line. However, the marking is preferably formed by a magnetization of the measuring ring, the magnetization being variable in the peripheral direction. The detector detects this magnetization accordingly.

It is useful that the measuring ring is magnetized peripherally in the form of a periodic function.

SUMMARY OF THE INVENTION

In a preferred embodiment of the invention, the magnetization is limited to an outer ring of the measuring ring, wherein the detector is disposed radially opposite this outer ring.

It is preferred that the detector comprise two measurement recorders separated from one another in the peripheral direction of the measuring ring, the separation of the recorders being such that positions of the detector within a period of the periodic function can be determined from the measurements, whereas larger rotational angles can be determined by counting periods.

In one embodiment of the invention, two freewheels can be provided, the two freewheels acting in opposite rotational directions. This makes it possible to measure torques in both rotational directions, in other words to measure positive and negative torques.

In another configuration of the invention, devices for registering slip between the first and the second rotating element are provided. Such slip would destroy the clear relationship between the angle $\alpha$ of relative rotation of the rotating elements and the torque M which causes this relative rotation, and would distort the torque measurement.

It becomes possible to check the slip when the torque to be measured exhibits a definite temporal pattern, in particular if it exhibits periodicity. The latter phenomenon occurs when the torque is introduced to the freewheel by way of a bicycle crank arm. A maximum torque always occurs when the pedaling force is directed perpendicular to the respective crank arm connecting rod.

It is preferable for there to be devices for detecting the period duration T.

In another embodiment of the invention, devices are provided for determining times when the rotation between the rotating elements reaches an extreme value.

The devices for registering slip between the rotating elements can then compare time differences between successive extremes in relative rotation between the rotating elements with the period duration T. If the time intervals are equal to the period duration T, slip between the rotating elements can be ruled out.

In another preferred embodiment of the invention, devices are provided for detecting the relative rotation between the rotating elements during a specified phase T' of the temporal pattern of the torque to be determined. It is useful for there to be a maximum relative rotation a between the rotating elements during the specified phase.

The devices for detecting the relative rotation during the specified phase can be provided for the purposes of detecting the relative rotation $\Delta\alpha$ beginning from the time at which the maximum occurs until the end of the specified phase T'. Near the maximum, minimum slip can be expected.

The invention is described further below with the aid of exemplary embodiments and the attached drawings which relate to the same.

BRIEF DESCRIPTION OF THE DRAWINGS

FIG. 1 a schematic representation of a torque sensor according to the invention;

FIG. 2 a representation showing how a measuring ring of the torque sensor of FIG. 1 is scanned by a detector;

FIG. 3 a representation that describes the magnetization of a measuring ring of the torque sensor of FIG. 1;

DESCRIPTION OF THE PREFERRED EMBODIMENTS

Figure 4:
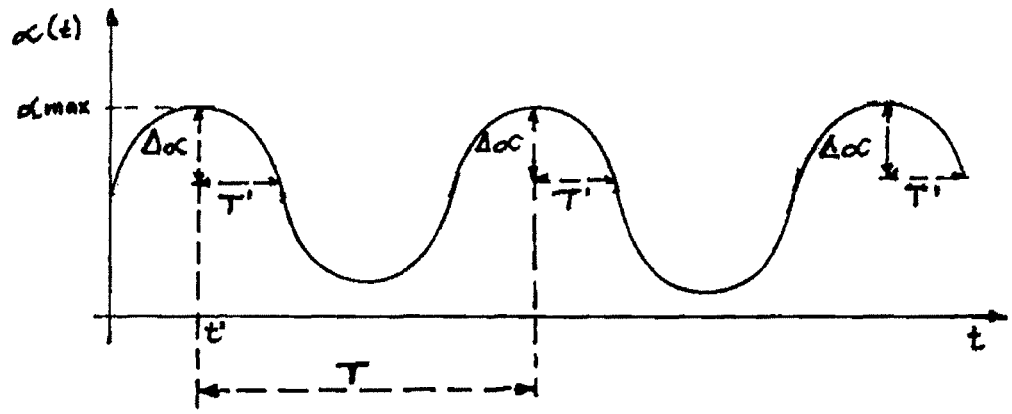
FIG. 4 a diagram showing the relative rotation a of rotating elements of the torque sensor as a function of time.

A torque sensor comprises a freewheel 1, designed as a freewheel bearing, with a first rotating element 2 and a second rotating element 3 which is coaxial with respect to the first rotating element 2. For example, rotating element 2 could be connected to a coaxial drive shaft, and rotating element 3 could be in drive connection with a gear of a bicycle (drive shaft and gear not shown).

Disposed between the hollow cylindrical rotating elements 2,3 are ball bearings 4 and 5. The reference number 6 refers to devices for dragging the second rotating element 3 by means of the first rotating element 2 in such a way that a torque can be transferred by the first rotating element 2 to the second rotating element 3 in one rotational direction. No such transfer can be made in the opposite rotational direction. The rotating element 3 can freely rotate in this direction on rotating element 2.

As can also be seen in FIG. 1, rotating element 2 is connected to a measuring ring 7, and rotating element 3 is connected to a measuring ring 8. According to FIG. 3, the measuring rings 7, 8, which are disposed coaxial to the rotating elements 2,3 and are offset axially, comprise an outer layer 9 which is magnetized peripherally, corresponding to a functional pattern as indicated by 10.

Detectors 11, 12, each of which is connected to an associated evaluation unit 15, are located in fixed positions relative to respective outer ring surfaces of measuring rings 7,8. These detectors scan the magnetization of the measuring rings 7,8, the magnetization changing in periodic fashion in the peripheral direction. As shown in FIG. 2, each of the detectors has two measurement recorders 13,14, each of which supplies one signal, the recorders being separated by a distance in the peripheral direction of the measuring rings 7,8 in such a way that the precise position of each measuring ring within a magnetization period can be determined from the ratio of the measurement signals from the measurement recorders 13, 14.

In freewheel operation in which no torque is transferred, the rotational velocity n' of rotating element 3 is larger than the rotational velocity n of rotating element 2, which could be standing still. When a torque is applied at the first rotating element 2, a rotational acceleration of rotating element 2 causes rotational velocity n to approach rotational velocity n' and ultimately to exceed it.

The detectors 11,12, independently of one another, continuously determine the rotational angles and rotational velocities of measuring rings 7,8, said angles and velocities coinciding with the rotational angles and rotational velocities n, n' of rotating elements 2,3, respectively. The relative rotation, i.e. the difference between the measured rotational angles of rotating element 2 and rotating element 3, is measured beginning from the time at which the rotational velocity n of rotating element 2 just exceeds the rotational velocity n' of rotating element 3. The larger the angle of relative rotation α, the larger the transferred torque. The evaluation unit 15 determines the transferred torque M with the aid of a stored relationship between the relative rotation a and the torque M.

One way to determine the rotational angle is to count the magnetization periods that have passed. Intermediate positions within periods can be determined precisely by evaluating the two measurement signals of the measurement recorders 13 and 14 using the evaluation unit 15. A clear relationship between the ratio of the two measurement signals and the position of the measuring ring within periods results based on the shape of the periodic function.

Furthermore, each of the measuring rings 7,8 could be magnetized in multiple tracks, such as tracks corresponding to a sine and a cosine function, respectively, and each track could be assigned to one of the measurement recorders 13, 14. Then, the measurement signals from the measurement recorders 13, 14 could be used to determine the precise positions as well as the directions of rotation.

In the determination of the torque in the manner described above, a prerequisite was that, in cases where n>n', the rotating elements 2,3 rotate relative to one another by angle α with no slip occurring, wherein a counteracting torque M(a) is produced which is equal to the acting torque, the counteracting torque continuously increasing with angle α and being approximately proportional to angle α.

However, non-slip relative rotation cannot always be assumed. Primarily after a longer period of operation of the freewheel 1, a noticeable delay in the grasping of the freewheel can occur despite the condition n>n' being met. Moreover, relative slipping movements of the rotating elements 2,3 also cannot be ruled out even after grasping occurs and even as the n>n' condition continues to be met. In other words, the slipping motions can also occur during the transfer of torque by the freewheel 1.

Slipping motions such as these between the rotating elements 2,3 can cause there to be no clear relationship between the torque M applied at freewheel 1 and the angle α of relative rotation of the rotating elements 2, 3, the relationship being needed to clearly determine M. The goal must therefore be to eliminate the effect of slipping motions on the determination of the torque M. Ways of accomplishing this are described below with the aid of FIG. 4.

FIG. 4 shows the plot of the angle α of rotation of the rotating elements 2,3 when the torque M to be measured, for example using a crank arm, and in particular the crank arm of a bicycle, is introduced to rotating element 2. Whenever the exerted pedaling force is perpendicular to the connecting rod, the torque M reaches a maximum. Because of the proportionality between M and a, a maximum of this kind results for angle α as well. When the crank arm is evenly engaged, and provided that there is no slip, the periodic temporal pattern α (t) shown in FIG. 4 is in effect, with period duration T.

The period duration T, in other words the time frame between two maxima of the angle of relative rotation a of rotating elements 2,3, for example, can be measured. Alternatively, the period duration T can be determined by measuring the angular or rotational velocity n of rotating element 2 through the relationship $n=2\pi/T$.

Provided that after each period duration T a maximum of angle α occurs while engagement of the crank arm is even, and that in addition the same angular value is reached, slip between the rotating elements 2,3 can be ruled out. Continuous monitoring of whether slip is occurring or not can be achieved by detecting each time t' at which a maximum of angle α occurs, detecting the angular velocity n and then determining whether a maximum occurs again at time t'+T. If so, no slip has occurred and the determined value α of the angle of relative rotation between the rotating elements 2, 3 can be used to determine the torque M.

However, if slip has occurred, the determination of M would require that the rotation of the rotating elements 2,3 relative to one another be determined during a phase of the temporal patterns α (t) at which the slip is as small as possible. According to FIG. 4, a phase of duration T' following a maximum value a max is a possible candidate in this regard, wherein duration T' is in an arbitrarily established relationship with period duration T. During this phase T', the relative rotation of rotating elements 2, 3 decreases by angle $\Delta\alpha$, wherein $\Delta\alpha$ is in specific proportion to $\alpha_{max}$. There exists a functional relationship between the maximum torque $M_{max}$, which corresponds to $\alpha_{max}$, and angle $\Delta\alpha$; this relationship can be used to determine $M_{max}$ from measured values of $\Delta\alpha$.

Figure 5:
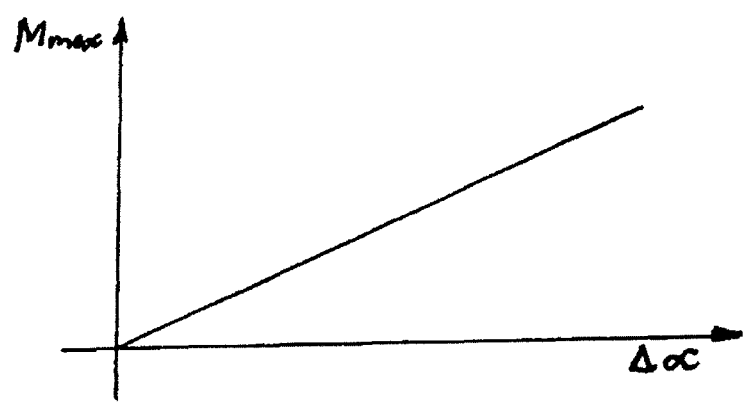
FIG. 5 a correlation between the torque to be measured and a change $\Delta\alpha$ in the angle $\alpha$ of relative rotation.

There exists an approximate proportionality between $M_{max}$ and $\Delta\alpha$, as can be seen in FIG. 5.

Thus, to measure $M_{max}$, the time t' at which a maximum $\alpha_{max}$ occurs is determined, and then the change $\Delta\alpha$ which results after this time up to the end of phase T' is determined. The period duration T and thereby the duration of phase T' can be determined from the angular velocity n of rotating element 2 ($T=2\pi/n$), wherein the angular velocity n can be measured simultaneously with the determination of time T', for example.

For example, the time difference between one of the two inflection points of function $\alpha(t)$ near $\alpha_{max}$ and $\alpha_{max}$ could also be used as phase T', as could the time difference between the two inflection points themselves.

The invention claimed is:

1. A torque sensor comprising:
    a freewheel with a first rotating element for transferring a torque to be determined to a second rotating element which is coaxial to the first rotating element, said freewheel being adapted to transfer said torque in one rotational direction only; and
    devices for determining a rotation a of the first rotating element relative to the second rotating element in said rotational direction as well as for determining the torque using the determined relative rotation; and
    wherein the devices for determining the relative rotation of the rotating elements serve to determine the rotational angle of the rotating elements independent of one another, said relative rotation being determined as the difference between the rotational angles of the rotating elements.

2. The torque sensor according to claim 1, wherein the devices for determining the relative rotation of the rotating elements serve to determine derivations of the rotational angles of the two rotating elements as a function of time.

3. The torque sensor according to claim 1, wherein the devices for determining the relative rotation of the rotating elements comprise at least one measuring ring which is coaxial to one of the rotating elements, said measuring ring comprising a peripheral marking and a detector for scanning the marking.

4. The torque sensor according to claim 3, wherein the marking is formed by a magnetization of the measuring ring, said magnetization being variable in the peripheral direction.

5. The torque sensor according to claim 4, wherein the measuring ring is magnetized in the peripheral direction in the form of a periodic function.

6. The torque sensor according to claim 1, wherein an outer layer of the measuring ring is magnetized.

7. The torque sensor according to claim 3, wherein the detector comprises two measurement recorders disposed in the peripheral direction of the measuring ring and separated by a distance in such a way that the position of the measuring ring within a period of the periodic function can be determined from the measured values of the measurement recorder.

8. The torque sensor according to claim 1, wherein the torque sensor comprises a plurality of coaxial freewheels which act in opposite rotational directions.

9. The torque sensor according to claim 1, comprising devices for registering slip between the rotating elements.

10. The torque sensor according to claim 1, wherein the torque to be determined exhibits a definite temporal pattern, in particular a periodicity.

11. The torque sensor according to claim 10, comprising devices for detecting the period duration.

12. The torque sensor according to claim 1, comprising devices for detecting times at which the relative rotation between the rotating elements has reached an extreme value.

13. The torque sensor according to claim 9, wherein the devices for registering slip between the rotating elements are provided for the purposes of comparing the time differences between successive extreme values of the relative rotation between the rotating elements with the period duration.

14. The torque sensor according to claim 10, comprising devices for detecting the relative rotation between the rotating elements during a specified phase of the temporal patterns of the torque to be determined.

15. The torque sensor according to claim 14, wherein a maximum relative rotation between the rotating elements occurs during the specified phase.

16. The torque sensor according to claim 15, wherein the devices for detecting the relative rotation during the specified phase is provided for the purposes of detecting the relative rotation from the time at which the maximum has occurred until the end of the specified phase, wherein the duration of the phase is in specific relationship to the period.

* * * * *